United States Patent [19]

Brunn et al.

[11] 4,285,013

[45] Aug. 18, 1981

[54] MOUNTING ASSEMBLY FOR A DEFLECTION YOKE

[75] Inventors: Otto Brunn, Wernau; Eberhard Nill, Esslingen, both of Fed. Rep. of Germany

[73] Assignee: International Standard Electric Corp., New York, N.Y.

[21] Appl. No.: 19,977

[22] Filed: Mar. 12, 1979

[30] Foreign Application Priority Data

Apr. 5, 1978 [DE] Fed. Rep. of Germany ....... 2814575

[51] Int. Cl.[3] ......................... H01F 7/00; H04N 5/645

[52] U.S. Cl. ..................................... 358/248; 335/210

[58] Field of Search ................ 358/248, 249; 355/210, 355/212, 213; 313/75, 489

[56] References Cited

U.S. PATENT DOCUMENTS

| | | | |
|---|---|---|---|
| 3,781,730 | 12/1973 | Salmers | 335/210 |
| 3,921,110 | 11/1975 | Ishii et al. | 358/248 |
| 4,095,260 | 6/1978 | Suzuki | 358/248 |

FOREIGN PATENT DOCUMENTS

| | | |
|---|---|---|
| 2224702 | 7/1975 | Fed. Rep. of Germany . |
| 2445577 | 4/1976 | Fed. Rep. of Germany . |
| 2558353 | 7/1976 | Fed. Rep. of Germany . |
| 2656829 | 6/1977 | Fed. Rep. of Germany . |
| 2730544 | 1/1978 | Fed. Rep. of Germany . |

*Primary Examiner*—Robert L. Richardson
*Assistant Examiner*—Edward L. Coles
*Attorney, Agent, or Firm*—John T. O'Halloran; Robert A. Walsh

[57] ABSTRACT

In a shadow-mask color-picture tube, adjustability of the deflection yoke on the tube is required. A ring is mounted around the front portion of the deflection yoke. The ring being supported by the yoke is free to move axially and can be swivelled. The ring is also lockable into a fixed position.

4 Claims, 4 Drawing Figures

MOUNTING ASSEMBLY FOR A DEFLECTION YOKE

BACKGROUND OF THE INVENTION

The present invention relates to a mounting assembly for a ring-shaped deflection yoke surrounding the neck of a cathode-ray tube and expanding toward the screen like a trumpet, with a mounting part provided at the narrower end opening of the deflection yoke and movable on the tube neck and capable of being inclined toward the tube axis, and a supporting part provided at the expanding end opening of the deflection yoke.

Accurate positioning of the deflection plane relative to the electron-gun system and the screen is required, for example, in a cathode-ray color picture tube working on the shadow-mask principle. In such a tube, on the one hand, convergence of the electron beams is to be achieved in the area of the shadow mask, and, on the other hand, stringent requirements are imposed on the angles of incidence of the electron beams on the shadow mask and on the screen to insure that each beam hits only the phosphor dot element it is meant to strike.

During the manufacture of such a tube, inaccuracies are likely to occur which might lead to an undue degradation of picture quality. These inaccuracies are compensated for, to a certain degree, by subsequent adjustment of the deflection yoke.

To do this, the deflection yoke should be movable along and about the tube axis, and its inclination to the tube axis should be capable of being changed.

German Printed Patent Application (DE-AS) No. 2,224,702 discloses such an adjustable mounting assembly for a deflection yoke in which the yoke is held on one side from the front and in which, following adjustment, the elements designed to connect the yoke with the tube are surrounded with adhesives. Such an assembly has the disadvantage that the yoke must be held in position until the adhesive has hardened. In addition, the one-sided mounting of the yoke requires relatively heavy mounting parts. Thirdly, such a joint is difficult to separate if readjustment of the yoke becomes necessary. The same reference shows a second, similar assembly in which the yoke is locked in position by means of screws. This eliminates the need to wait for the adhesive to harden, and readjustment is possible without difficulty, but there is still the relatively heavy design because of the one-sided mounting of the deflection yoke. In addition, for automatic production, in which the yoke is adjusted by means of a device acting on the yoke directly from outside and moving it, that second assembly is unsuitable because it will be difficult to automatically lock these screws so that the setting found will not be changed again, because there are forces acting against the setting.

Another assembly is known from German Published Patent Application (DE-OS) No. 2,558,353 in which the deflection yoke is held from the front by means of spring arms projecting over the yoke. While not having the last-mentioned disadvantage, this assembly, because of the spring arms projecting over the yoke on one side only and acting on the yoke from outside at particular points only, must be of very heavy design which, in addition, hardly permits subsequent readjustment because the spring arms must be bonded or welded to the yoke.

An apparently more advantageous assembly is disclosed in German Published Patent Application (DE-OS) No. 2,445,577, in which the deflection yoke is supported by the rear, narrow end of the tube neck, while in front a spherical surface permits the yoke to be swivelled about its rear end, and additional rings fitted together also allow axial movement. This assembly has the disadvantage of requiring a large number of parts at the front end of the yoke which must also be relatively rugged because of their multitude and of the need to absorb forces exerted by the yoke in all directions.

An assembly known from German Published Patent Application No. 2,656,829 appears much simpler in construction. Here, the deflection yoke is mounted at the rear end so as to be axially movable and capable of being swivelled relative to the tube axis because of the elasticity of the mounting, while the front end of the yoke is supported by the tube via adjustable, screw-shaped legs. However, this assembly has the disadvantage mentioned last for the second arrangement of the above-cited DE-AS No. 2,224,702, namely that in case of automatic adjustment by means of a device acting from outside, the setting found is likely to be changed by the tightening of the screw-shaped supporting legs.

As assembly which appears to be free from this disadvantage is disclosed in German Published Patent Application No. 2,730,544. Here, the deflection yoke can be swivelled and is axially movable by being held in front in a ring mounted on the tube cone, while the rear end of the yoke, following adjustment, is screwed to an inclinable plate movable on the tube neck. Since the swivel point of the deflection yoke lies at the front end, a larger rear opening of the deflection yoke is necessary to obtain a sufficient swivel angle. This, in turn, decreases the electric deflection sensitivity of the deflection coils, which can only be compensated for by increased electric power.

SUMMARY OF THE INVENTION

The object of the invention is to provide an adjustable deflection yoke mounting of the kind described at the beginning which does not have the above-described disadvantages of the prior art assemblies.

The invention is characterized in that the supporting part provided at the expanding end of the deflection yoke is constituted by a ring around the front portion of the deflection yoke which ring is supported by and freely movable on the cone and is mounted on the deflection yoke so as to be free to move axially therealong and swivel thereon and to be lockable in position.

The principal advantage of the invention lies in the simplicity of the means by which the object of the invention is achieved.

In a preferred embodiment of the invention, the ring supporting the deflection yoke is fixed by means of screws distributed along its circumference.

In another embodiment, the ring to be fixed on the deflection yoke is designed as a clamp.

In a further embodiment of the invention, spring elements are provided between the ring and the deflection yoke which serve to force the ring against the tube cone. It is also possible to provide wedge-shaped elements which are permanently connected with the cone and increase the angle of the contact surface between ring and cone and a plane normal to the tube axis.

BRIEF DESCRIPTION OF THE FIGURES

Further details and embodiments will be apparent from the following description and from the accompanying drawings, in which.

DESCRIPTION OF THE PREFERRED EMBODIMENT

Figure 1:
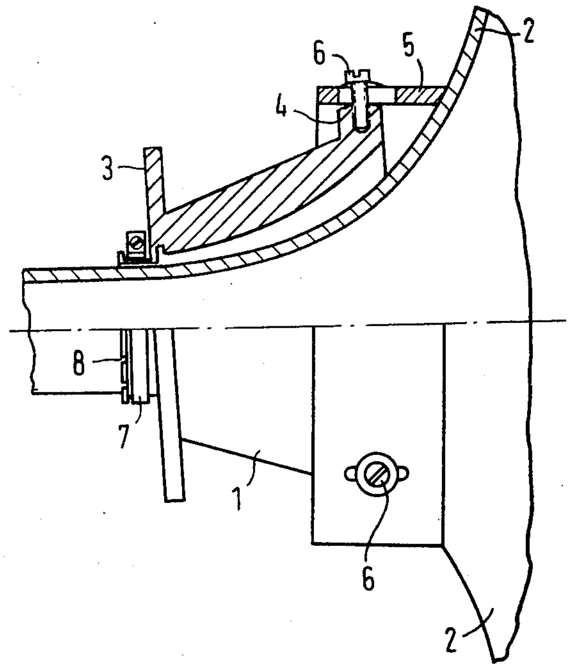
FIG. 1 shows an embodiment of a deflection yoke mounting according to the invention in a part section.

FIG. 1 shows how a deflection yoke according to the invention, 1, is disposed on the cone 2 of a cathode-ray tube. In this embodiment, a mounting part 3 is provided at the narrow end of the deflection yoke 1. In a known manner, the deflection yoke is mounted on the tube neck by tightening a clamp 7 and by means of elastic tongues projecting away from the mounting part 3 and lying on the neck. The tongues are formed by indentations 8 in a tubular extension of the mounting part 3. The mounting part 3 is stronger and larger than is necessary for the actual function of the deflection yoke in order to offer a sturdy point of action for a yoke-aligning device acting from outside. The substantially cylindrical, expanding front end 4 of the deflection yoke 1 is surrounded by a ring 5 which, after the yoke has been aligned by means of a device acting from outside, is forced from outside against the tube cone and then held in this position on the yoke 1 by means of screws 6. Before the device acting from outside can be removed, the clamp 7 at the narrow end of the yoke must be tightened. The axial movability between the ring 5 and the yoke 1 is achieved by shaping the holes for the fastening screws 6 in the ring 5 as oblong holes extending in the longitudinal direction of the tube. The necessary short swivel motion of the ring 5 relative to the yoke 1 is made possible by some play between the ring 5 and the yoke 1 and by a thin-walled and elastic design of the ring 5.

Figure 2:
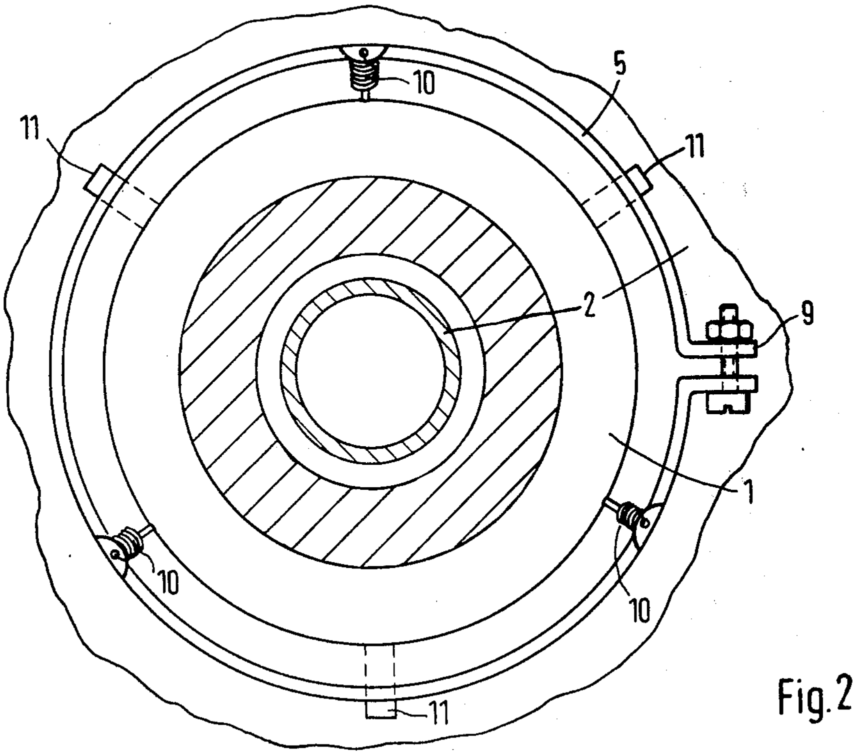
FIG. 2 shows the essential parts of a second embodiment in a section perpendicular to the tube axis.

The section through a deflection yoke in FIG. 2 shows essential features of further embodiments of the invention. Through a bolted joint 9, the ring 5 serves as a clamp which, when tightened, connects the ring 5 firmly with the yoke 1.

Also shown are springs 10 which constantly force the ring 5 against the cone also during adjustment of the yoke, thereby eliminating the need to press on the ring from outside after adjustment.

FIG. 2 also shows wedge-shaped portions 11 on the cone. Through these portions 11, the contact surface between ring 5 and cone 2 is to make an angle of about 45° with the tube axis because it is at approximately this angle that optimum conditions are achieved for the action of the ring 5. Especially in the case of picture tubes with large deflection angles, the natural curvature of the cone will give no suitable angle of the contact surface between ring 5 and cone 2, so that the use of the wedge-shaped portions 11 will be of advantage. Instead of individual portions 11 as shown in FIG. 2, a closed ring of suitable cross section may be used.

Figure 3:
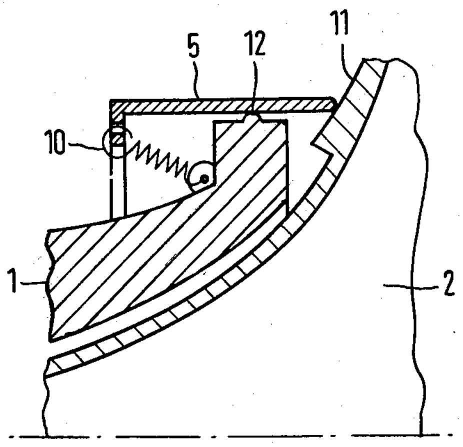
FIG. 3 shows the essential features of the second embodiment in a part section along the tube axis.

The embodiment of the spring elements 10 and of the wedge-shaped portions 11 of FIG. 2 is again illustrated in FIG. 3 in a part section. FIG. 3 also shows a ring-shaped bulge 12 on the cylindrical outer surface of the wide-open end of the deflection yoke. This bulge increases the angular adjustability of the ring 5.

Figure 4:
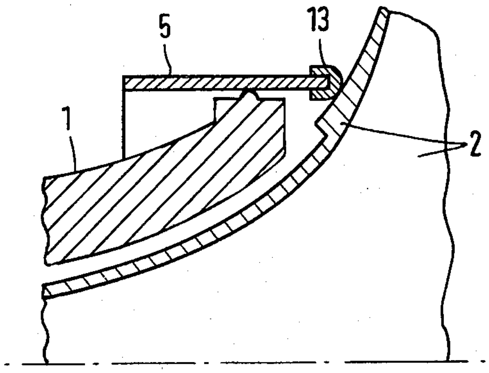
FIG. 4 shows a section of another embodiment of a detail of the invention.

FIG. 4 shows an embodiment of another detail. The front edge of the ring 5 is surrounded with elastic material 13. According to the contact pressure of the ring 5 against the cone 2 prior to the fixing of the ring on the deflection yoke, after the fixing of the ring 5 and the tightening of the clamp 7 a prestress is developed between the cone 2 and the yoke 1 which insures that the yoke is held in a fixed position on the tube.

We claim:

1. In a mounting assembly for a ring-shaped deflection yoke surrounding the neck of a cathode-ray tube and expanding toward the screen like a trumpet, with a mounting part provided at the narrower end opening of the deflection yoke and movable on the tube neck and capable of being inclined toward the tube axis, and a supporting part provided at the expanding end opening of the deflection yoke, wherein the improvement comprises the supporting part constituted by a ring around the front portion of the deflection yoke which ring is supported by and freely movable on the tube cone, spring elements are positioned between the ring and the deflection yoke for forcing the ring forward against the cone, and the ring is mounted on the deflection yoke so as to be free to move axially therealong and swivel thereon and to be lockable in position.

2. A mounting assembly as claimed in claim 1, wherein at least two screws are distributed along the circumference of the ring for mounting the ring on the deflection yoke.

3. A mounting assembly as claimed in claim 1, wherein the ring is provided with a clamp for mounting the ring on the deflection yoke.

4. A mounting assembly as claimed in claim 1, wherein the cone has wedge-shaped portions such that the angle between the cone and a plane normal to the tube axis increases in the area where the ring is in contact with the cone.

* * * * *